United States Patent Office 3,542,507
Patented Nov. 24, 1970

3,542,507
RECOVERY OF TIN FROM TIN BEARING SOLUTIONS
Jerome J. Ross, Minneapolis, Minn., assignor to General Mills, Inc., a corporation of Delaware
No Drawing. Filed Dec. 1, 1967, Ser. No. 687,094
Int. Cl. G01g 19/00, 19/02
U.S. Cl. 23—53                                    12 Claims

ABSTRACT OF THE DISCLOSURE

A process for the recovery of tin existing as ionic or free tin in a tin bearing solution wherein the tin bearing solution is treated with a stoichiometric amount, based on the tin content and acid value of the solution if any, and preferably an excess thereof, of an aqueous alkali metal hydroxide solution with subsequent recovery of tin as a tin salt.

---

This invention relates to a method of recovering tin and tin catalysts from systems, particularly organic systems such as those encountered in the production of α-tocopherols.

The problem of recovery of tin used as a catalyst in organic synthesis reactions has been a troublesome one. Many processes have been suggested and tried, each found wanting in various aspects. A specific example is the process of incineration of waste streams which results in great losses of tin. It has also been suggested to precipitate tin as a tin oxide, but the tin oxide is often occluded and contaminated with organic impurities.

In addition, various methods of processing the tin by smelting have resulted in odious, noxious and corrosive combustion products.

This invention in its broader aspects relates to a tin recovery process wherein the tin is present in an ionic or free tin state and is converted to an aqueous soluble form by treatment with an alkali metal hydroxide solution followed by the removal of any organic contaminates, and isolation of the tin in the aqueous phase as a tin salt.

An example of a suitable organic waste stream containing ionic or free tin, i.e. tin which is not organically bound, is that which occurs in the methylation of tocopherols such as is disclosed in U.S. 2,486,542. Generally, in such a process the reaction mixture is treated with an organic solvent and separates into a two-phase system. The upper, solvent layer contains all tocopherol values and a lower organic phase is a waste layer. The latter contains acetone, water, formaldehydes and its derivatives, excess hydrochloric acid, tin and/or tin chlorides, and various condensation products, etc. It is the recovery of tin from the above stream that the process of this application is most useful. However, the process of recovering tin as disclosed herein is not limited to the above specific organic waste stream, as this process may also be used for inorganic streams as well as other organic streams.

This invention therefore primarily comprises converting stannic ions in an aqueous or organic medium to the metal stannate by treatment with an alkali metal hydroxide solution and then precipitating the soluble metal stannate as a tin salt. In a modification of this process, it is also desirabel to convert all stannous ions to stannic ions as disclosed herein.

All solution strengths as disclosed herein refer to a weight basis unless otherwise so indicated. When stoichiometric amounts are referred to herein it is in reference to the tin present in the system. In addition, when referring to stoichiometric amounts of an alkali metal hydroxide, the amount is in reference to the tin present as well as the amount required to neutralize the solution if the tin bearing solution is acidic.

When practicing this invention, the amount of alkali to be employed is determined from the acid value and the tin content of the waste stream. To determine the acid value, a conventional acid value determination is made by titrating a 50 gram sample of the waste stream to a pH 7.0 with a standardized alkali solution, e.g. potassium hydroxide. The number of milligrams of potassium hydroxide per gram of sample required for neutralization is the acid value. Tin content can be determined by any number of conventional methods, e.g. wet analysis, spectroscopy, etc.

When practicing an embodiment of this invention an organic waste stream containing ionic or free tin of known tin content and acid value is weighed into a reaction vessel. A stoichiometric amount of an alkali metal hydroxide solution needed to neutralize the acid and to react to form an alkali metal stannate with the available tin is added to the reaction vessel. Preferably the alkali metal hydroxide is sodium hydroxide as a solution of greater than 10% and less than 50% in concentration, preferably 15–30%. To insure the best possible recovery, it is preferable to keep the temperature of the exothermic reaction to less than 50° C. since at a temperature above 50° C., volatile organics boil off and poor separation occurs. Stirring is continued after complete addition of the sodium hydroxide solution to assure complete mixing. At the completion of this step, the mixture readily stratifies into a clear aqueous layer and an organic upper phase. The lower aqueous layer is strongly alkaline and has an observed pH in excess of 12, generally 13.1–13.3. The organic tin-free upper phase may be discarded, or treated to recover the organic solvents, if desired, and the tin present in the lower aqueous phase can be precipitated to give a recoverable tin product.

Strong alkali metal hydroxide solutions must be used to get a stratification of the organic and aqueous phases, and conversion of the tin to a soluble stannate. Suitable strong alkali metal hydroxides includes lithium hydroxide, potassium hydroxide and sodium hydroxide. It has been found that a solution of 10% concentration of alkali metal hydroxide produces unsatisfactory results since poor stratification of the organics will occur. Likewise, a concentration of 50% or more produces spontaneous rapid heating to boiling accompanied by lumpy solids. Therefore, it is desirable to keep within the range of solution concentration greater than 10% and less than 50% alkali metal hydroxide. Most satisfactory results were obtained when using a solution of 15–30% concentration of the alkali metal hydroxide. It is also desirable to use a slight excess of alkali, up to 20% excess over the stoichiometric amount, to insure that all acid is neutralized.

To recover the tin in the aqueous phase after treatment with an alkalai metal hydroxide and separation of the organic and aqueous phases, it is preferable to cool the aqueous phase to less than 30° C. A stoichiometric amount of calcium chloride plus an excess, preferably 5–20%, is added to the aqueous phase as a 20% $CaCl_2$ solution with stirring, whereupon a white precipitate containing calcium stannate, $CaSnO_3$, forms. In addition to the calcium chloride, other calcium halides may be used to precipitate the tin salt, such as calcium bromide, calcium iodide, and calcium fluoride. Magnesium halides, e.g., magnesium chloride, etc., are also suitable.

As an aid in filtering the calcium stannate, it is desirable to neutralize any excess alkali with hydrochloric acid. The calcium stannate is allowed to settle and is then filtered by conventional means.

Other methods of separating the tin from the aqueous phase after treatment with a strong alkali metal hydroxide solution may also work satisfactorily. However, it was found that the calcium tin salt after precipitation was the most easy to filter. It is also possible to recover the tin as stannic oxide after treatment with the alkali metal hydroxide solution and phase separation. A suitable procedure is to add a 10% solution of sulfuric acid to the aqueous phase to adjust the pH. of the aqueous phase. Generally as the pH is adjusted from 7.0 to 3.0 the recovery of tin decreases from 98.0% to 76.9%. However, as indicated above the stannic oxide did not filter as rapidly as the calcium tin salt.

Generally recovery of the tin was in excess of 75% of the available tin. However, recoveries in excess of 95% can be obtained by practicing a slight modification of this process. To obtain such high recoveries it is essential that any stannous ion present in the tin bearing solution be converted to stannic ion by pretreatment of the tin bearing solution with sodium hypochlorite. When practicing this modification, an aqueous solution of sodium hypochlorite is added in molar ratio equal to that of any stannous ion present prior to treatment with the alkali metal hydroxide solution. In this manner any stannous ion present is converted to stannic ion. Addition of the alkali metal hydroxide solution will then assure conversion of essentially all present tin to the soluble alkali metal stannate. Other oxidizing agents can also be used such as sodium nitrate, hydrogen peroxide, etc., but oxidation may not be as rapid.

As indicated previously, the tin recovery need not necessarily be restricted to organic streams. Aqueous mixtures containing tin in the ionic or tin free state can be treated with the alkali metal hydroxide solution as indicated above to form a soluble alkali metal stannate and then further processed as disclosed herein.

The following examples will further illustrate but are not intended to limit the scope of this invention.

EXAMPLE I

The organic waste stream from the methylation of tocopherals as disclosed in U.S. 2,486,542 and containing acetone, acetone condensation products, water, excess hydrochloric acid, formaldehyde and its derivatives, tin, and other organic compounds was analyzed for tin content and acid value. These values were determined to be 10.4% tin and acid value of 260.6 mg. KOH per gram of organic stream. A 100 gram sample om this organic waste stream was placed in a 600 ml. beaker which was equipped with a stirrer and a thermometer. A 20% sodium hydroxide solution containing 30.8 grams of sodium hydroxide was prepared and added to the organic waste stream at such a rate so as to keep the temperature below 45–50° C. This amount of sodium hydroxide was determined to be the stoichiometric amount to convert the tin to sodium stannate and neutralize all the acid plus a 20% excess. The total time for this addition was 25 minutes. The observed pH of the resulting mixture was 13.1–13.3. Stirring was continued for another 10 minutes to assure complete mixing. The resulting mixture was allowed to stand and cool, and upon standing, the mixture stratified into an organic upper phase and an aqueous lower phase. The lower phase was separated, collected and analyzed for tin content by conventional means. Of the available tin, 0.13% was determined to be in the upper organic phase and 99.87% in the lower aqueous phase. The tin in the aqueous phase was determined to be present as sodium stannite and sodium stannate.

EXAMPLE II

The aqueous solution of Example I containing sodium stannite and sodium stannate was cooled to 30° C. A solution containing 20% of calcium chloride (10.2 grams of calcium chloride) was added to the separated aqueous solution of Example I. This was a stoichiometric amount of calcium chloride plus an excess of 5% needed to convert the tin to a calcium tin salt, calcium stannate. Over the ten minute period of addition, a white precipitate containing calcium stannate was formed. A 10% hydrochloric acid solution, 51.3 grams, was added to the slurry to neutralize excess alkali. The mixture was allowed to stand for five minutes with continued stirring. The solids were then filtered and dried to a pale yellow palpable powder which was then determined to contain calcium stannate. The analysis of the dried powder showed a 95% recovery of the available tin.

EXAMPLE III

The procedure of Example I was repeated. The alkaline aqueous layer after treatment as in Example I was adjusted to various pH's with a 10% sulfuric acid solution. A precipitate containing stannic oxide was obtained. The precipitate was filtered as in Example II. The recovery of tin at various pH values is summarized in the table below.

| pH: | Percent tin recovered |
| --- | --- |
| 3.0 | 76.9 |
| 4.0 | 82.9 |
| 5.0 | 84.6 |
| 6.0 | 77.4 |
| 7.0 | 98.0 |

EXAMPLE IV

A 10% aqueous mixture, pH 1.4, of stannous chloride was prepared by dissolving 11.29 grams of $SnCl_2 \cdot 2\ H_2O$ in an appropriate amount of water. To this mixture, there are rapidly added with stirring 59.8 grams of 6.2% sodium hypochlorite. The pH of the resulting clear solution was 0.75. This stirred solution was then treated with a stiochiometric amount of 20% sodium hydroxide solution. A precipitate of $Sn(OH)_4$ formed and redissolved to yield a solution of sodium stannate. The sodium stannate was then precipitated as a calcium-tin salt, calcium stannate, as in Example II by the addition of 27.88 grams of a 20% calcium chloride solution. The precipitate containing calcium stannate formed rapidly and settled. After filtration the dried sample was analyzed by conventional methods and found to contain 99% of the available tin.

EXAMPLE V

Example I was repeated using lithium hydroxide and potassium hydroxide respectively. In each case, the alkali metal tin compounds, i.e. lithium stannate and potassium stannate were formed in the aqueous phase which could then be precipitated and recovered as in Example II.

EXAMPLE VI

Example II was repeated except that $MgCl_2$ was used in place of the $CaCl_2$. The precipitate containing magnesium stannate contained 93.5% of the available tin.

The process of this invention provides a simple method of obtaining a tin product which can be processed by conventional processing techniques without the presence of odious, noxious, and corrosive combustion products. Furthermore, there is substantial removal of any organic contaminate which would otherwise interfere in recovery operations. Losses of tin due to processing by conventional methods is kept to a minimum by the operation of this process. The recovery of tin from various tin catalyst processes such as are used in the methylation of tocopherols results in desired economic benefits in the preparation of many products. Furthermore, the resulting tin precipitate of this process is relatively free of organic impurities, a significant factor in conventional smelting techniques. Other advantages and embodiments will be readily apparent to those of ordinary skill in the art.

The embodiments of this invention in which an exclusive property or privilege is claimed are defined as follows:

1. A process for the recovery of tin values from organic solutions in which tin is not organically bound comprising treating said tin solution with an aqueous solution of an alkali metal hydroxide, said aqueous solution having an alkali metal hydroxide concentration of greater than 10% and less than 50% by weight to form an upper essentially tin free organic phase and a lower, tin rich aqueous phase, separating said phases and subsequently precipitating tin values from the aqueous phase.

2. The process of claim 1 wherein the tin bearing solution is acidic and said acidic solution is made alkaline by the addition of the alkali metal hydroxide solution.

3. The process of claim 1 wherein the alkali metal hydroxide is selected from the group consisting of sodium hydroxide, potassium hydroxide or lithium hydroxide.

4. The process of claim 1 wherein the tin solution contains stannous ion and comprising the further step of converting said stannous ion to stannic ion by treatment with sodium hypochlorite prior to the alkali metal hydroxide solution treatment.

5. The process of claim 1 wherein the aqueous solution of the alkali metal hydroxide contains 15–30% by weight of the alkali metal hydroxide.

6. The process of claim 1 wherein the alkali metal hydroxide treatment raises the observed pH of the tin solution to at least 12.0.

7. The process of claim 1 wherein the tin is precipitated as stannic oxide by adjusting the pH of the separated aqueous phase to 3.0–7.0 by treatment with sulfuric acid.

8. The process of claim 1 wherein the separated aqueous phase is treated with at least a stoichiometric amount of an aqueous calcium halide solution, thereby precipitating the tin as calcium stannate.

9. The process of claim 8 wherein the calcium halide solution contains 20% calcium chloride.

10. The process of claim 8 wherein the calcium stannate is filtered from the aqueous phase.

11. The process of claim 10 wherein the excess alkali in the aqueous phase is neutralized by treatment with hydrochloric acid prior to filtration.

12. The process of claim 1 wherein the separated aqueous phase is treated with at least a stoichiometric amount of an aqueous magnesium halide solution thereby precipitating the tin as magnesium stannate.

References Cited
UNITED STATES PATENTS

| | | | |
|---|---|---|---|
| 322,157 | 7/1885 | Catlin | 23—53 |
| 1,811,142 | 6/1931 | Little | 23—53 X |
| 2,621,109 | 12/1952 | Richter | 23—144 |

FOREIGN PATENTS

| | | |
|---|---|---|
| 640,352 | 7/1950 | Great Britain. |
| 756,863 | 9/1956 | Great Britain. |

HERBERT T. CARTER, Primary Examiner

U.S. Cl. X.R.

23—144